(12) United States Patent  
Chen

(10) Patent No.: US 12,264,708 B2  
(45) Date of Patent: Apr. 1, 2025

(54) OIL COLLECTING BUSHING FOR BEARING AND TRANSMISSION

(71) Applicant: Schaeffler Technologies AG & Co. KG, Herzogenaurach (DE)

(72) Inventor: Da Chen, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 82 days.

(21) Appl. No.: 18/032,833

(22) PCT Filed: Oct. 21, 2020

(86) PCT No.: PCT/CN2020/122429  
§ 371 (c)(1),  
(2) Date: Apr. 20, 2023

(87) PCT Pub. No.: WO2022/082490  
PCT Pub. Date: Apr. 28, 2022

(65) Prior Publication Data  
US 2023/0392646 A1 Dec. 7, 2023

(51) Int. Cl.  
*F16C 33/66* (2006.01)

(52) U.S. Cl.  
CPC ...... *F16C 33/6659* (2013.01); *F16C 33/6637* (2013.01); *F16C 33/6666* (2013.01); *F16C 2361/61* (2013.01)

(58) Field of Classification Search  
CPC .............. F16C 33/6637; F16C 33/6659; F16C 33/6666; F16C 33/6681; F16C 2361/61;  
(Continued)

(56) References Cited

U.S. PATENT DOCUMENTS 3,796,283 A * 3/1974 Raby .................. F16N 7/18  
184/11.2  
3,857,462 A 12/1974 Kaufman et al.  
(Continued)

FOREIGN PATENT DOCUMENTS

AT 279977 B 3/1970  
CN 101835995 A 9/2010  
(Continued)

*Primary Examiner* — Alan B Waits

(57) ABSTRACT

An oil collecting bushing for a bearing. The bushing is used for guiding lubricating oil into a roller path of a bearing, and includes a cylindrical bushing main body and a plurality of oil claws. An oil collecting groove for collecting the lubricating oil is formed on an inner circumferential part of the bushing main body, and the bushing main body is provided with a plurality of openings which penetrate the bushing main body and which are in communication with the oil collecting groove. The plurality of oil claws are arranged at the parts of the bushing main body where the openings are formed, and each oil claw is formed so as to warp radially outwards from the bushing main body. Therefore, under the centrifugal force generated during the rotation of an oil collecting bushing the lubricating oil from the oil collecting groove can be guided into the roller path by the oil claws via the corresponding openings. With the oil collecting bushing, the bearing is not only effectively lubricated, but is also cooled down. Further provided is a transmission comprising the oil collecting bushing.

10 Claims, 4 Drawing Sheets

(58) Field of Classification Search
CPC ........ F16H 57/04; F16H 57/0471; F16N 7/18; F16N 7/26; F16N 2210/14
See application file for complete search history.

(56) References Cited

U.S. PATENT DOCUMENTS

| | | | | |
|---|---|---|---|---|
| 4,319,499 | A * | 3/1982 | Sanui .................. | F16H 57/0483 |
| | | | | 184/6.12 |
| 4,342,489 | A * | 8/1982 | Lenz .................. | F16N 7/36 |
| | | | | 384/465 |
| 8,529,134 | B2 * | 9/2013 | Sekimoto .............. | F16C 19/163 |
| | | | | 384/465 |

FOREIGN PATENT DOCUMENTS

| | | |
|---|---|---|
| CN | 103502694 A | 1/2014 |
| CN | 103797253 A | 5/2014 |
| CN | 104913034 A | 9/2015 |
| CN | 106662889 A | 5/2017 |
| CN | 108253016 A | 7/2018 |
| CN | 108953392 A | 12/2018 |
| DE | 102017130339 A1 | 6/2019 |
| FR | 3025580 A3 | 3/2016 |
| FR | 3096748 A1 | 12/2020 |
| FR | 3123102 A1 | 11/2022 |
| JP | 2004183780 A | 7/2004 |
| JP | 2008240938 | 10/2008 |

* cited by examiner

OIL COLLECTING BUSHING FOR BEARING AND TRANSMISSION

CROSS-REFERENCE TO RELATED APPLICATIONS

This application is the U.S. National Phase of PCT Appln. No. PCT/CN2020/122429 filed Oct. 21, 2020, the entire disclosure of which is incorporated by reference herein.

TECHNICAL FIELD

The present disclosure relates to the field of bearing lubrication for vehicles, in particular to an oil collecting bushing for a bearing and a transmission comprising the oil collecting bushing.

BACKGROUND

In a transmission of a vehicle, a bearing is a core part, and sufficient lubrication can ensure the normal operation of the bearing. The existing lubrication methods for bearings in the transmission mainly involve oil lubrication. Splash lubrication is used in oil lubrication for common bearings in the transmission, that is, a certain amount of lubricating oil is splashed into the bearing through a gear.

However, splash lubrication often cannot effectively cool high-speed bearings in the transmission while sufficiently lubricating the bearing. Therefore, in most cases, for high-speed bearings in the transmission, forced oil injection lubrication is used instead to ensure that a sufficient amount of lubricating oil flows through the bearing, thereby effectively cooling the high-speed bearing while sufficiently lubricating the bearing.

SUMMARY

The present disclosure is provided in view of the conditions of the prior art as described above. An objective of the present disclosure is to provide a novel oil collecting bushing for a bearing, which can effectively cool for example the bearing in a transmission while fully lubricating the bearing with a simple structure. The oil collecting bushing is especially suitable for high-speed bearing lubrication and cooling. Another objective of the present disclosure is to provide a transmission comprising the above-mentioned oil collecting bushing for the bearing.

To achieve the above objects, the following technical solutions are adopted.

The present disclosure provides an oil collecting bushing for a bearing as follows. The oil collecting bushing is used for guiding lubricating oil into a roller path of the bearing, the oil collecting bushing having an axial direction, a radial direction and a circumferential direction and comprising:

a cylindrical bushing main body, wherein an oil collecting groove for collecting the lubricating oil is formed on an inner circumferential part of the bushing main body, and the bushing main body is provided with a plurality of openings which penetrate the bushing main body and which are in communication with the oil collecting groove; and a plurality of oil claws arranged at parts of the bushing main body where the openings are formed, wherein each oil claw is formed so as to warp radially outwards from the bushing main body, therefore, under the centrifugal force generated during the rotation of the oil collecting bushing, the lubricating oil from the oil collecting groove can be guided into the roller path by the corresponding oil claws via the openings.

Preferably, the bushing main body comprises an axial central portion and two axial side end portions, the axial central portion is connected to the two axial side end portions and is located between the two axial side end portions, and the axial central portion protrudes radially outwardly relative to the two axial side end portions, so that the inner circumferential part of the axial central portion forms a shape that is recessed radially outwardly to form the oil collecting groove.

More preferably, in a cross section of the bushing main body taken along the radial direction, two axial side end portions of the bushing main body extend linearly in the axial direction, and the axial central portion of the bushing main body is formed in an arc shape so that the bushing main body has a substantially Ω-shaped cross-section shape.

More preferably, a base end portion of each oil claw that is connected to the bushing main body is connected to the radially outermost part of the axial central portion.

More preferably, the oil collecting groove extends continuously along the circumferential direction over an entire circumference of the bushing main body, and the plurality of openings are uniformly distributed in the circumferential direction at intervals.

More preferably, the plurality of oil claws correspond to the plurality of openings in a one-to-one manner, and the oil claws are formed into a flat plate shape or an arc plate shape extending obliquely radially outwards while extending from the bushing main body towards one axial side.

More preferably, the oil collecting bushing is formed by integral stamping.

The present disclosure further provides a transmission as follows, the transmission comprising the oil collecting bushing for the bearing according to any one of the technical solutions above and a bearing corresponding to the oil collecting bushing.

Preferably, the oil collecting bushing and the bearing are fitted on a shaft of the transmission, an inner ring of the bearing is fixed on the shaft, the oil collecting bushing is fixed relative to the inner ring in such a manner that it is pressed against the inner ring in the axial direction of the shaft, and the bushing main body of the oil collecting bushing can have a predetermined amount of elastic deformation in the axial direction of the shaft.

More preferably, free end portions of the oil claws of the oil collecting bushing that are far away from the bushing main body extend into an area between the inner ring and an outer ring of the bearing, so that the lubricating oil can be guided into the roller path between the inner ring and the outer ring.

By adopting the above-mentioned technical solution, the present disclosure provides a novel oil collecting bushing for a bearing and a transmission comprising the oil collecting bushing. The oil collecting bushing comprises a cylindrical bushing main body and a plurality of oil claws arranged on the bushing main body. The bushing main body is provided with an oil collecting groove for collecting lubricating oil and the openings which penetrate the bushing main body and which are in communication with the oil collecting groove. By arranging the oil claws at parts of the bushing main body where the openings are formed and making the oil claws warp radially outwards from the bushing main body, the centrifugal force generated during the rotation of the oil collecting bushing can be used for guiding the lubricating oil from the oil collecting groove into the roller path of the bearing by the corresponding oil claws via the openings. Therefore, the oil collecting bushing according to the present disclosure is simple in structure, and in addition to that, it can guide a sufficient amount of lubricating oil in the oil collecting groove into the roller path of the bearing, thereby not only effectively lubricating the bearing, but also cooling down the bearing. The oil collecting bushing is especially suitable for high-speed bearing lubrication and cooling.

DETAILED DESCRIPTION

Exemplary embodiments of the present disclosure will be described below with reference to the attached drawings. It should be understood that these specific descriptions are only used to teach those skilled in the art how to implement the present disclosure, and are neither intended to be exhaustive of all possible variations of the present disclosure nor to limit the scope of the present disclosure.

In the present disclosure, unless otherwise specified, "axial direction", "radial direction" and "circumferential direction" respectively refer to the axial direction, radial direction and circumferential direction of an oil collecting bushing (bushing main body) according to the present disclosure. "One axial side" refers to the left side in FIG. 2 and FIG. 3, and "other axial side" refers to the right side in FIG. 2 and FIG. 3. A structure of an oil collecting bushing according to one embodiment of the present disclosure is described below with reference to the accompanying drawings.

Figure 1:
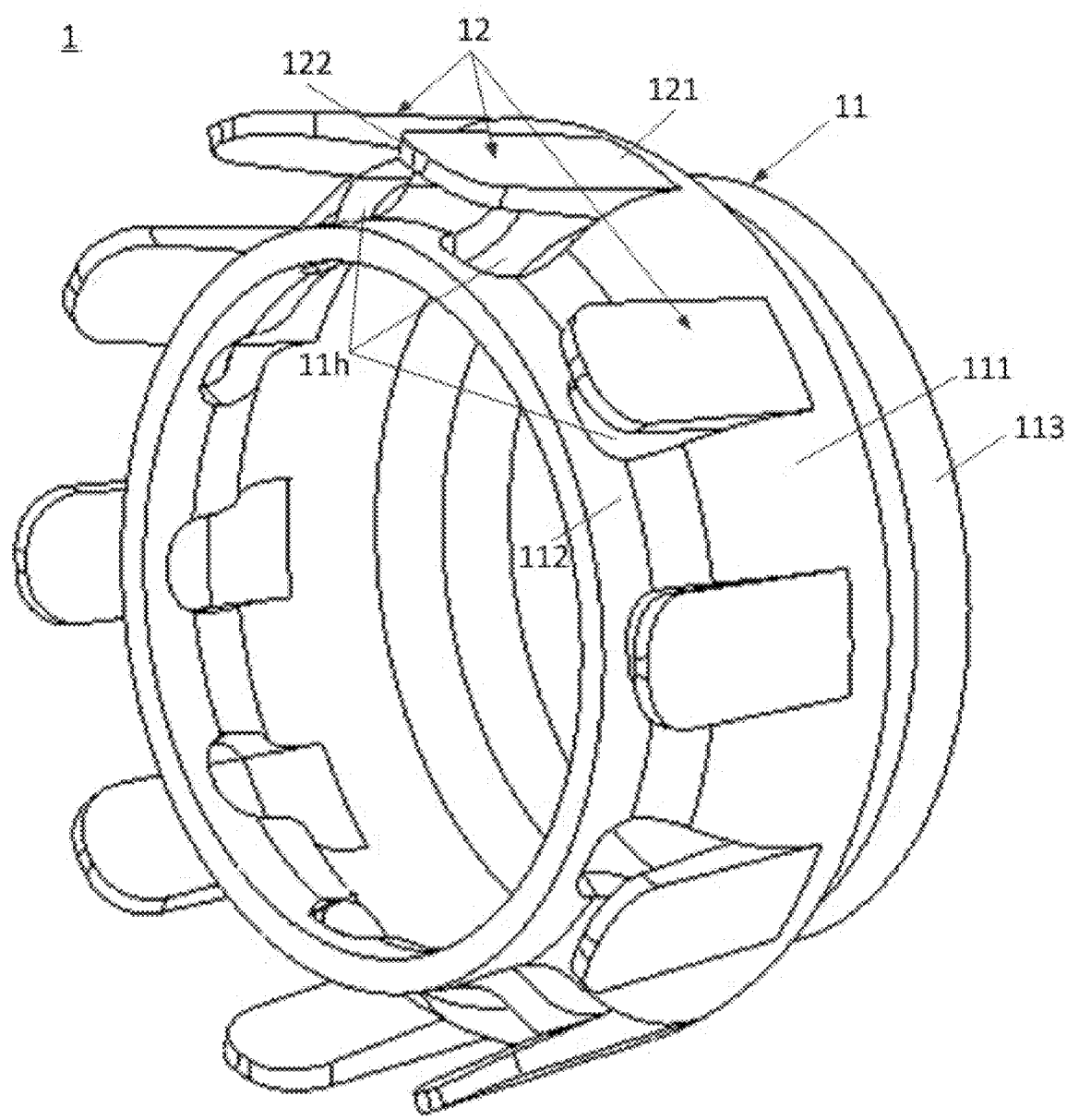
FIG. 1 is a perspective schematic diagram of a structure of an oil collecting bushing for a bearing according to one embodiment of the present disclosure.
Figure 2:
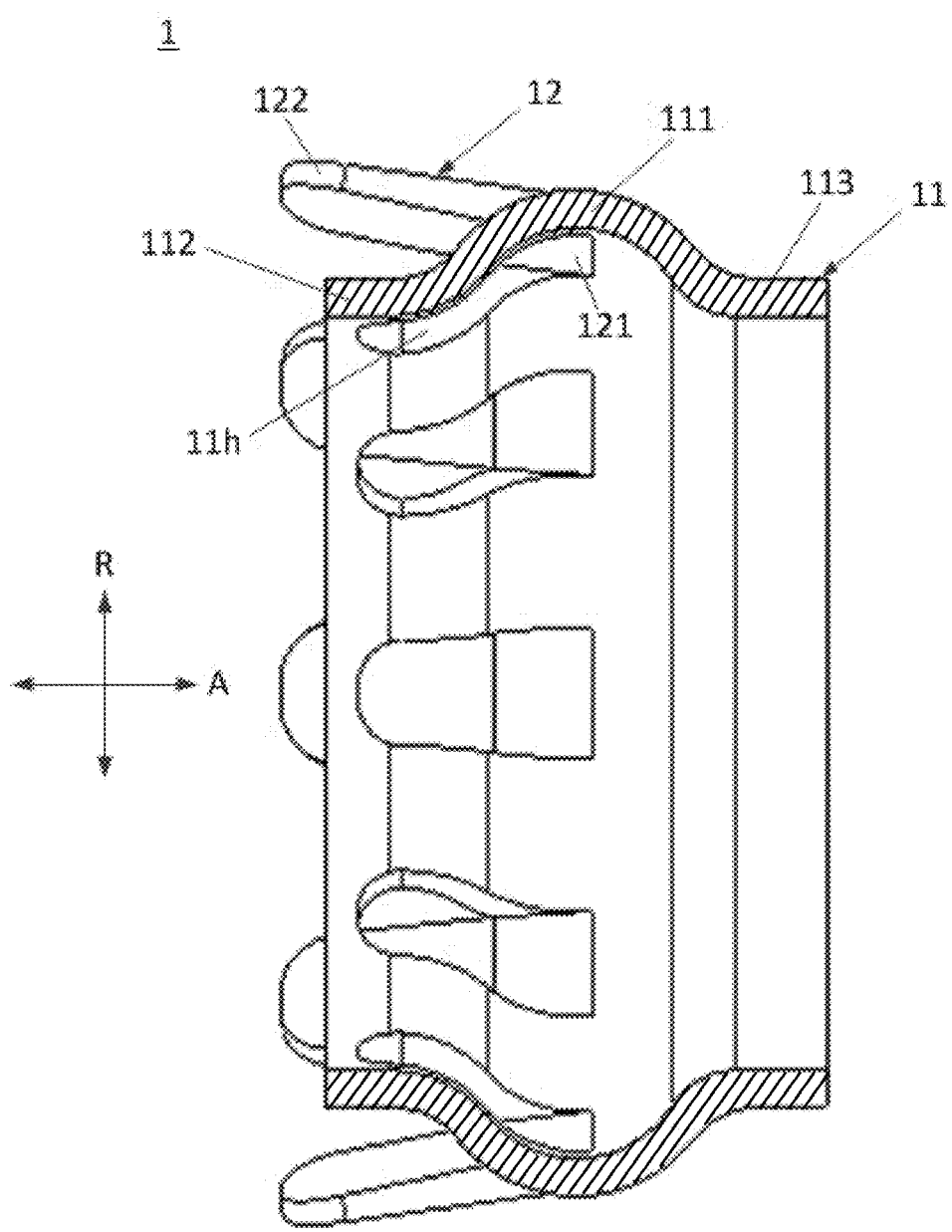
FIG. 2 is a sectional schematic diagram of a structure of an oil collecting bushing for a bearing in FIG. 1, in which hatching is omitted.
Figure 3:
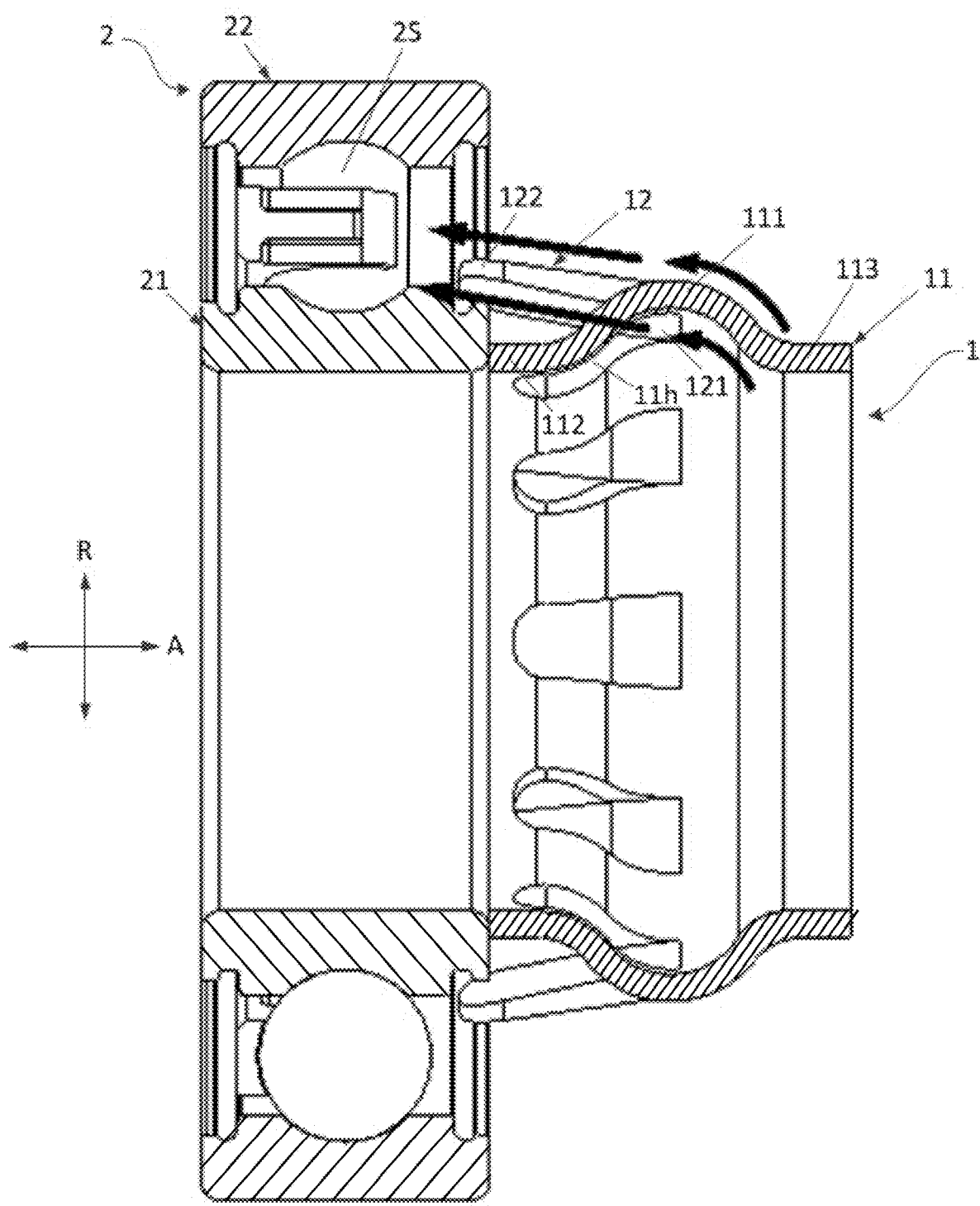
FIG. 3 is a sectional schematic diagram of a state in which an oil collecting bushing for a bearing in FIG. 1 and a corresponding bearing are assembled to an input shaft of a transmission, in which hatching is omitted, and the black solid arrow represents a flow path and a flow direction of the lubricating oil being guided into a roller path of the bearing through the oil collecting bushing.

As shown in FIGS. 1 to 3, an oil collecting bushing 1 for a bearing according to one embodiment of the present disclosure comprises a bushing main body 11 and oil claws 12, which are integrated as a whole, and the oil collecting bushing 1 is used for guiding lubricating oil into a roller path 2S of a corresponding bearing 2 that is for roller mounting so as to effectively realize lubrication and cooling of the bearing 2 at the same time. In the present embodiment, the oil collecting bushing 1 is formed for example by integrated stamping.

In the present embodiment, the bushing main body 11 has a substantially cylindrical shape. In an axial direction A, the bushing main body 11 is divided into three portions, specifically comprising an axial central portion 111 and two axial side end portions 112 and 113; and the axial central portion 111 is connected to the two axial side end portions 112 and 113 and is located there between. In a cross section of the bushing main body 11 taken along the axial direction A, one axial side end portion 112 of the two axial side end portions 112 and 113 extends linearly along the axial direction A, and other axial side end portion of the one axial side end portion 112 is connected to one axial side end of the axial central portion 111; and other side end portion 113 of the two axial side end portions 112 and 113 has the same size as the one axial side end portion 112 and also extends linearly along the axial direction A, and one axial side end of other axial side end portion 113 is connected to other axial side end of the axial central portion 111. The axial central portion 111 is formed in a circular arc shape that protrudes radially outwardly with respect to the two axial side end portions 112 and 113, so that the bushing main body 11 has a substantially Ω-shaped cross section in the cross section of the bushing main body 11 taken along the axial direction A.

Figure 4:
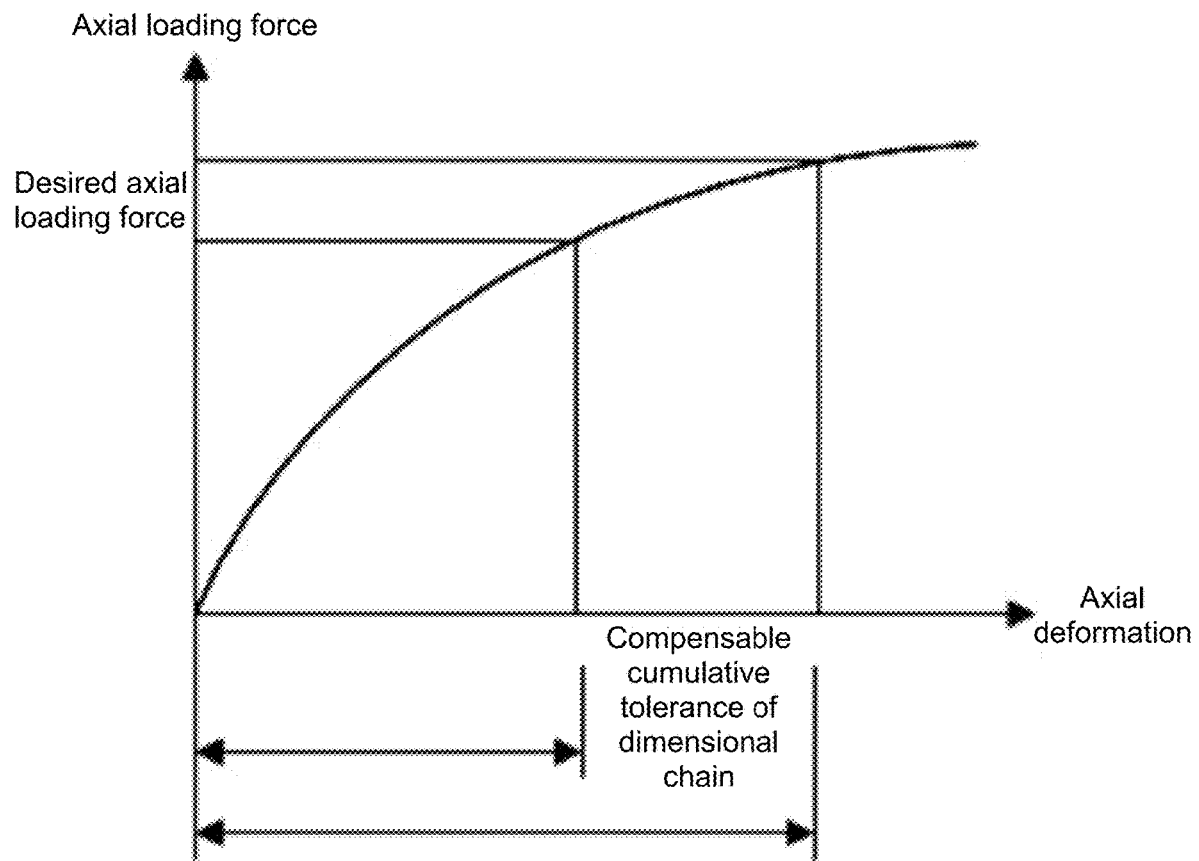
FIG. 4 is a characteristic graph of a relationship between an axial preload force (vertical axis) on a bushing main body of an oil collecting bushing for a bearing in FIG. 1 and amount of axial deformation in an axial direction (horizontal axis).

Therefore, on the one hand, the inner circumferential part of the axial central portion 111 is formed into a shape that is recessed radially outwardly to form an oil collecting groove which extends continuously along the circumferential direction over an entire circumference of the bushing main body 11 and is used for collecting lubricating oil. On the other hand, the bushing main body 11 having a substantially Ω-shaped cross section has the relationship characteristics between an axial loading force and an axial deformation as shown in the characteristic graph in FIG. 4, thereby enabling compensation for the cumulative tolerance of a dimensional chain of a plurality of components of the shaft mounted to the transmission in the axial direction of the shaft.

In addition, a portion of the bushing main body 11 from the radially outermost part of the axial central portion 111 to one axial side end portion 112 is provided with a plurality of openings 11h distributed in the circumferential direction. All the openings 11h are spaced apart from one another and evenly distributed in the circumferential direction. Each opening 11h penetrates the bushing main body 11 in a radial direction R and is in communication with the oil collecting groove, so that lubricating oil collected in the oil collecting groove can flow to the corresponding oil claw 12 via the opening 11h.

In the present embodiment, a plurality of oil claws 12 are formed utilizing portions obtained by stamping the plurality of openings 11h on the bushing main body 11, so that the plurality of oil claws 12 are fixed to the parts of the bushing main body 11 where the openings 11h are formed. Specifically, a base end portion 121 of each oil claw 12 that is connected to the bushing main body 11 is connected to the radially outermost part of the axial central portion 111 of the bushing main body 11, and each oil claw 12 is formed into a flat plate shape or an arc plate shape (having an arc-shaped cross section) extending obliquely radially outwards while extending from the bushing main body 11 towards one axial side, so that each oil claw 12 warps towards one axial side and radially outwards from the radially outermost part of the axial central portion 111 of the bushing main body 11. In the present embodiment, there is a one-to-one mapping relationship between the plurality of oil claws 12 and the plurality of openings 11h. Therefore, under the centrifugal force generated during the rotation of the oil collecting bushing 1, the lubricating oil from the oil collecting groove can be respectively guided into the roller path 2S of the bearing 2 by the corresponding oil claws 12 via the openings 11h, thereby effectively realizing the lubrication and cooling of the bearing 2.

In addition, the present disclosure also provides a transmission, which comprises an oil collecting bushing 1 for a bearing having the above structure and a bearing 2 corresponding to the oil collecting bushing 1. The mounting and function of the oil collecting bushing 1 are described, taking the bearing 2 as an example of the bearing between an input shaft of the transmission and a transmission casing.

As shown in FIG. 3, the oil collecting bushing 1 and the bearing 2 are fitted on the input shaft (not shown) of the transmission in a substantially coaxial manner. An inner ring 21 of the bearing 2 is fixed to the input shaft by, for example, an interference fit, and a bushing main body 11 of the oil collecting bushing 1 is fixed relative to the inner ring 21 in such a manner that it is pressed against the inner ring 21 in an axial direction of the input shaft by an axial load force, so that the bushing main body 11 can have a predetermined amount of elastic deformation in the axial direction of the input shaft. A transition fit can be achieved between the bushing main body 11 of the oil collecting bushing 1 and the input shaft, and free end portions 122 of oil claws 12 of the oil collecting bushing 1 that are far away from the bushing main body 11 are aligned, preferably close to or extending into an area between the inner ring 21 and an outer ring 22 of the bearing 2.

By adopting the above solution, as shown in FIG. 3, during the rotation of the input shaft of the transmission, the lubricating oil from the input shaft can pass through an inner circumferential surface and an outer circumferential surface of the oil collecting bushing 1 respectively so as to be guided into a roller path 2S of the bearing 2 by the oil claw 12, due to the centrifugal force. The lubricating oil passing through the inner circumferential surface of the oil collecting bushing 1 will pass through an oil collecting groove of an axial central portion 111 of the bushing main body 11 and an opening 11h in sequence, and then be guided into the roller path 2S of the bearing 2 along the inner circumferential surface of the oil claw 12; and the lubricating oil passing through the outer circumferential surface of the oil collecting bushing 1 will pass through the outer circumferential surface of other axial end portion 113 of the bushing main body 11 and the outer circumferential surface of the axial central portion 111 in sequence, and then be guided into the roller path 2S of the bearing 2 along the outer circumferential surface of the oil claw 12. Therefore, a sufficient amount of lubricating oil can be guided into the roller path 2S of the bearing 2 that is for roller mounting between the inner ring 21 and the outer ring 22, so as to effectively realize lubrication and cooling of the bearing 2 at the same time.

Moreover, a plurality of components comprising the oil collecting bushing 1 and the bearing 2 need to be mounted side by side on the input shaft in the axial direction of the input shaft, and at least one shim is required in the prior art to compensate for cumulative tolerance of the dimensional chain of these components in the axial direction of the input shaft. However, in the transmission comprising the oil collecting bushing 1 having the above structure, the cross section of the bushing main body 11 of the oil collecting bushing 1 is formed in a substantially Ω shape, and there are relationship characteristics between the axial loading force and the axial deformation as shown in the characteristic graph in FIG. 4. Therefore, a smaller range of desired axial loading force can correspond to a larger range of axial deformation, that is, a smaller range of desired axial loading force can compensate for a relatively large range of cumulative tolerance of the dimensional chain, so that it is convenient to compensate the cumulative tolerance of the dimensional chain of a plurality of components in the axial direction of the input shaft.

It should be understood that the above-mentioned embodiments are exemplary only and are not intended to limit the present disclosure. Those skilled in the art can make various modifications and changes to the above-mentioned embodiments according to the teaching of the present disclosure without departing from the scope of the present disclosure. In addition, supplementary explanation is made as follows.

(i) Although it is described in the above specific embodiments that the oil claws 12 are integrally formed with the bushing main body 11, the present disclosure is not limited thereto. In an alternative solution, the oil claws 12 and the bushing main body 11 may be separately formed, in which case the oil claws 12 are then fixed to the bushing main body 11 by means such as welding.

Further, the oil claws do not have to be fixed with the bushing main body, for example, the oil claws can be arranged on the bushing main body in a manner that they can swing and/or rotate relative to the bushing main body, so as to adjust the direction of guiding the lubricating oil from the oil collecting bushing to the corresponding bearing.

Further, the number of the openings 11h of the bushing main body 11 that are in communication with the oil collecting groove and the number of the oil claws 12 is not limited to any specific value and can be set as needed, and the openings 11h and the oil claws 12 may not form a one-to-one mapping relationship.

(ii) Although one oil collecting bushing 1 is provided for one bearing 2 in FIG. 3, the present disclosure is not limited thereto. If necessary, two oil collecting bushings 1 for example may be provided corresponding to one bearing 2.

(iii) It is to be understood that the oil collecting bushing 1 according to the present disclosure can be formed by a stamping process, resulting in low cost and better performance. In addition, the oil collecting bushing 1 has a simple structure and allows the forced lubrication function of the bearing 2 to be easily realized, which is especially suitable for high-speed bearings with high heat generation. Compared with an existing forced oil injection lubrication solution, the oil collecting bushing 1 according to the present disclosure only adopts a single part, and has compact size, high reliability and significant cost advantage.

In addition, the oil collecting bushing 1 according to the present disclosure can also conveniently compensate the cumulative tolerance of the dimensional chain of a plurality of components in the axial direction of the input shaft.

LIST OF REFERENCE NUMERALS

1 Oil collecting bushing;
11 Bushing main body;
11h Opening;
111 Axial central portion;
112 One axial side end portion;
113 Other axial side end portion;
12 Oil claw;
121 Base end portion;
122 Free end portion;
2 Bearing;
21 Inner ring;
22 Outer ring;
2S Roller path;
A Axial direction;
R Radial direction.

The invention claimed is:

1. An oil collecting bushing for a bearing arranged for guiding lubricating oil into a roller path of the bearing, the oil collecting bushing having an axial direction, a radial direction and a circumferential direction and comprising:
- a cylindrical bushing main body, wherein an oil collecting groove for collecting the lubricating oil is formed on an inner circumferential part of the bushing main body, and the bushing main body is provided with a plurality of openings which penetrate the bushing main body and which are in communication with the oil collecting groove; and
- a plurality of oil claws arranged at parts of the bushing main body where the openings are formed, wherein each oil claw is formed so as to warp radially outwards from the bushing main body, therefore, under a centrifugal force generated during rotation of the oil collecting bushing, the lubricating oil from the oil collecting groove is guided into the roller path by the corresponding oil claws via the openings.

2. The oil collecting bushing for the bearing according to claim 1, wherein the bushing main body comprises an axial central portion and two axial side end portions, the axial central portion is connected to the two axial side end portions and is located between the two axial side end portions, and the axial central portion protrudes radially outwardly with respect to the two axial side end portions, so that the inner circumferential part of the axial central portion is formed into a shape that is recessed radially outwardly to form the oil collecting groove.

3. The oil collecting bushing for the bearing according to claim 2, wherein, in a cross section of the bushing main body taken along the radial direction, the two axial side end portions of the bushing main body extend linearly in the axial direction, and the axial central portion of the bushing main body is formed into an arc shape.

4. The oil collecting bushing for the bearing according to claim 2, wherein, a base end portion of each of the oil claws that is connected to the bushing main body is connected to a radially outermost part of the axial central portion.

5. The oil collecting bushing for the bearing according to claim 1, wherein the oil collecting groove extends continuously along the circumferential direction over an entire circumference of the bushing main body, and the plurality of openings are uniformly distributed in the circumferential direction at intervals.

6. The oil collecting bushing for the bearing according to claim 1, wherein the plurality of oil claws correspond to the plurality of openings in a one-to-one manner, and the oil claws are formed into a flat plate shape or an arc plate shape extending obliquely radially outwards while extending from the bushing main body towards one axial side.

7. The oil collecting bushing for the bearing according to claim 1, wherein the oil collecting bushing is formed by integrated stamping.

8. A transmission, comprising:
- a bearing; and
- an oil collecting bushing arranged for guiding lubricating oil into a roller path of the bearing, the oil collecting bushing having an axial direction, a radial direction and a circumferential direction and comprising:
- a cylindrical bushing main body, wherein an oil collecting groove for collecting the lubricating oil is formed on an inner circumferential part of the bushing main body, and the bushing main body is provided with a plurality of openings which penetrate the bushing main body and which are in communication with the oil collecting groove; and
- a plurality of oil claws arranged at parts of the bushing main body where the openings are formed, wherein each oil claw is formed so as to warp radially outwards from the bushing main body, therefore, under centrifugal force generated during rotation of the oil collecting bushing, the lubricating oil from the oil collecting groove is guided into the roller path by the corresponding oil claws via the openings.

9. The transmission according to claim 8, wherein the oil collecting bushing and the bearing are fitted on a shaft of the transmission, an inner ring of the bearing is fixed on the shaft, the oil collecting bushing is fixed relative to the inner ring in such a manner that it is pressed against the inner ring in an axial direction of the shaft, and the bushing main body of the oil collecting bushing is configured to have a predetermined amount of elastic deformation in the axial direction of the shaft.

10. The transmission according to claim 9, wherein free end portions of the oil claws of the oil collecting bushing extend into an area between the inner ring and an outer ring of the bearing, so that lubricating oil is guided into the roller path between the inner ring and the outer ring.

* * * * *